(12) United States Patent
Masaki et al.

(10) Patent No.: US 9,637,672 B2
(45) Date of Patent: May 2, 2017

(54) POLYESTER RESIN COMPOSITION AND MOLDED ARTICLE OF SAME

(71) Applicant: Kureha Corporation, Tokyo (JP)

(72) Inventors: Takashi Masaki, Tokyo (JP); Masahiro Yamazaki, Tokyo (JP); Takuma Kobayashi, Tokyo (JP); Hiroyuki Sato, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 14/386,595

(22) PCT Filed: Apr. 26, 2013

(86) PCT No.: PCT/JP2013/062400
§ 371 (c)(1),
(2) Date: Sep. 19, 2014

(87) PCT Pub. No.: WO2013/162002
PCT Pub. Date: Oct. 31, 2013

(65) Prior Publication Data
US 2015/0051119 A1    Feb. 19, 2015

(30) Foreign Application Priority Data

Apr. 27, 2012 (JP) .................. 2012-102935
Jan. 18, 2013 (JP) .................. 2013-007401

(51) Int. Cl.
| | |
|---|---|
| C09K 8/68 | (2006.01) |
| C09K 8/508 | (2006.01) |
| C09K 8/24 | (2006.01) |
| C09K 8/44 | (2006.01) |
| C08L 67/02 | (2006.01) |
| C08L 67/04 | (2006.01) |
| C09K 8/516 | (2006.01) |
| C09K 8/70 | (2006.01) |
| C08K 5/1539 | (2006.01) |
| C08K 5/51 | (2006.01) |
| C08K 5/09 | (2006.01) |
| C08K 5/521 | (2006.01) |
| C08K 3/32 | (2006.01) |

(52) U.S. Cl.
CPC .............. *C09K 8/24* (2013.01); *C08K 5/09* (2013.01); *C08K 5/1539* (2013.01); *C08K 5/51* (2013.01); *C08K 5/521* (2013.01); *C08L 67/02* (2013.01); *C08L 67/04* (2013.01); *C09K 8/44* (2013.01); *C09K 8/5086* (2013.01); *C09K 8/516* (2013.01); *C09K 8/68* (2013.01); *C09K 8/70* (2013.01); *C08K 3/32* (2013.01)

(58) Field of Classification Search
None
See application file for complete search history.

(56) References Cited

U.S. PATENT DOCUMENTS

| | | | | |
|---|---|---|---|---|
| 5,843,573 | A * | 12/1998 | Itoh ........................... | C08J 5/18 428/364 |
| 6,111,033 | A | 8/2000 | Loughman et al. | |
| 7,775,278 | B2 | 8/2010 | Willberg et al. | |
| 2011/0237755 | A1* | 9/2011 | Shoji .................... | C07D 245/02 525/420 |
| 2015/0361326 | A1 | 12/2015 | Masaki et al. | |

FOREIGN PATENT DOCUMENTS

| | | |
|---|---|---|
| JP | 2003-118803 A | 4/2003 |
| JP | 2011-256220 | 12/2011 |
| JP | 2012-012560 | 1/2012 |
| WO | WO/2007/066254 A2 | 6/2007 |
| WO | 2014/112479 A1 | 7/2014 |

OTHER PUBLICATIONS

Dec. 7, 2015 extended European Search Report issued in Application No. 13780586.7.
Oct. 28, 2014 International Preliminary Report on Patentability issued in Application No. PCT/JP2013/062400.
Jan. 25, 2016 Office Action issued in Canadian Application No. 2,867,111.
Jun. 12, 2015 Office Action issued in Canadian Patent Application No. 2,876,111.
International Search Report of PCT/JP2013/062400 dated Jul. 30, 2013.
Sep. 30, 2015 Office Action issued in Chinese Patent Application No. 2013800086792.
Sep. 6, 2016 Office Action issued in Japanese Patent Application No. 2014-512713.
Dec. 13, 2016 Office Action issued in Japanese Application No. 2014-512713.

* cited by examiner

*Primary Examiner* — John J Figueroa
(74) *Attorney, Agent, or Firm* — Oliff PLC

(57) ABSTRACT

A polyester resin composition comprising: 100 parts by mass of a polyester resin having at least 50% by mass of a glycolic acid resin; and from 0.5 to 50 parts by mass of a carboxylic acid anhydride.

13 Claims, No Drawings

POLYESTER RESIN COMPOSITION AND MOLDED ARTICLE OF SAME

TECHNICAL FIELD

The present invention relates to a polyester resin composition and a molded article of same, and particularly relates to a polyester resin composition containing a glycolic acid resin and a molded article of same.

BACKGROUND OF THE INVENTION

Aliphatic polyesters such as polyglycolic acid and polylactic acid are degraded by microorganisms or enzymes present in the natural world such as in the ground or the sea and have therefore attracted attention as biodegradable polymer materials with a small environmental burden. In addition to the biodegradability, these aliphatic polyesters have hydrolyzability and use of the aliphatic polyesters in various fields has been actively investigated in recent years.

Among aliphatic polyesters, polyglycolic acid (hereinafter also called "PGA") has excellent gas barrier properties and excellent heat resistance and/or mechanical strength. Therefore, the PGA is expected to be a packaging material for, for example, food that is susceptible to oxidative degradation and also a packaging material that is easily composted and has a small environmental burden. Furthermore, since the PGA has biodegradability and bioabsorbability, the PGA has been used as fibers in a medical field or the like.

In order to obtain petroleum and natural gas, oil wells and gas wells are drilled. Such drilling operations include the process of fracturing which increases the production of the petroleum and/or natural gas by boring a wellbore using a drill while mud water is circulated and then injecting fracturing fluid into a subterranean formation to create fractures. In addition, a treatment of oil wells and gas wells after drilling and completion operations using a slurry containing a degradable material has been proposed (e.g. see U.S. Pat. No. 7,775,278B specification (Patent Document 1)). Furthermore, WO/2007/066254 (Patent Document 2) discloses polyesters such as polylactic acid and polyglycolic acid acting as a degradable material constituting the fracturing fluid.

Note that, the present applicant has discovered that a dispersion liquid in which a particular polyglycolic acid resin in a finely divided solid state is dispersed in an aqueous medium is suitable for drilling or completion of oil and gas recovery, and has filed a PCT application (PCT/JP2011/73646).

CITATION LIST

Patent Literature

Patent Document 1: U.S. Pat. No. 7,775,278B
Patent Document 2: WO/2007/066254

SUMMARY OF THE INVENTION

Problems to be Solved by the Invention

Although the glycolic acid resin exhibits good degradability at high temperatures (e.g. 60° C. or higher), the rate of degradation of the glycolic acid resin at relatively low temperatures (e.g. less than 60° C., and preferably less than or equal to 50° C.) has not always been sufficient.

In light of the problems of the conventional technologies described above, an object of the present invention is to provide a polyester resin composition that requires a short time for degradation even in low temperature conditions (e.g. less than 60° C., and preferably less than or equal to 50° C.), in other words a polyester resin composition having excellent degradability, and a molded article formed from the resin composition.

Solution to Problem

As a result of diligent research to achieve the objective described above, the present inventors has discovered that a polyester resin composition having excellent degradability even at low temperatures (e.g. less than 60° C., and preferably less than or equal to 50° C.) as well as excellent storing properties can be obtained by adding a particular degradation accelerator into a polyester resin containing at least 50% by mass of a glycolic acid resin, and thus completed the present invention.

That is, the polyester resin composition of the present invention is a polyester resin composition comprising: 100 parts by mass of a polyester resin having at least 50% by mass of a glycolic acid resin; and from 0.5 to 50 parts by mass of a carboxylic acid anhydride.

In such a polyester resin composition, the carboxylic acid anhydride is preferably at least one type selected from the group consisting of an aliphatic monocarboxylic acid anhydride, an aromatic monocarboxylic acid anhydride, an aliphatic dicarboxylic acid anhydride, an aromatic dicarboxylic acid anhydride, an aromatic tricarboxylic acid anhydride, an alicyclic dicarboxylic acid anhydride, an aliphatic tetracarboxylic dianhydride, and an aromatic tetracarboxylic dianhydride.

The polyester resin composition of the present invention preferably further comprises from 0.01 to 10 parts by mass of a phosphorus compound per 100 parts by mass of the polyester resin. The phosphorus compound is preferably at least one type of organic phosphorus compound selected from the group consisting of phosphate and phosphite. The organic phosphorus compound preferably has at least one structure selected from the group consisting of a long-chain alkyl group having from 8 to 24 carbons, an aromatic ring, and a pentaerythritol skeleton.

Also, the molded article of the present invention is formed from such a polyester resin composition of the present invention, and the molded article preferably has any one form selected from powder, a pellet, a film, and a fiber. Furthermore, the well-treatment fluid of the present invention is a well-treatment fluid comprising such a molded article of the present invention.

Effect of the Invention

According to the present invention, a polyester resin composition that requires a short time for degradation even in low temperature conditions (e.g. less than 60° C., and preferably less than or equal to 50° C.), in other words a polyester resin composition having excellent degradability, and a molded article formed from the resin composition can be obtained.

DETAILED DESCRIPTION

The present invention will be described in detail hereinafter using preferred embodiments thereof.

First, the polyester resin composition of the present invention will be described. The polyester resin composition of the present invention is a polyester resin composition comprising: 100 parts by mass of a polyester resin having at least 50% by mass of a glycolic acid resin; and from 0.5 to 50 parts by mass of a carboxylic acid anhydride as a degradation accelerator.

Such a polyester resin composition of the present invention has excellent degradability even in low temperature conditions (e.g. less than 60° C., and preferably less than or equal to 50° C.). Specifically, the mass loss, after 1 g of this resin composition is immersed in 50 mL of ion exchanged water and kept at 40° C. for two weeks (more preferably for one week), is preferably 10% or greater (more preferably 15% or greater, and further preferably 20% or greater).

Hereinafter, each of the components of the present invention will be described.

Polyester Resin

The polyester resin used in the present invention is a polyester resin containing at least 50% by mass of a glycolic acid resin. The content of the glycolic acid resin is preferably 55% by mass or greater, more preferably 70% by mass or greater, further preferably 80% by mass or greater, and particularly preferably 90% by mass or greater, from the perspective of enhancing degradability of the polyester resin composition.

Glycolic Acid Resin

The glycolic acid resin used in the present invention is a polymer having glycolic acid units ($-OCH_2-CO-$). Examples of the glycolic acid resin include polyglycolic acid consisting only of the glycolic acid units (i.e. a glycolic acid homopolymer), and a glycolic acid copolymer containing glycolic acid units and constituent units derived from another monomer (hereinafter called "comonomer"). The glycolic acid copolymer is preferably a glycolic acid copolymer containing at least 50 mol % of the glycolic acid units per 100 mol % of total constituent units constituting the copolymer.

Note that, the glycolic acid unit is a unit derived from a monomer that imparts a $-OCH_2-CO-$ structure to the polymer by polymerization, and not necessarily a unit derived from glycolic acid. For example, in the present invention, the glycolic acid resin includes a polymer derived from glycolide which is a bimolecular cyclic ester of glycolic acids.

Examples of the comonomer include cyclic monomers such as ethylene oxalate (i.e. 1,4-dioxane-2,3-dione), lactides, lactones (e.g. β-propiolactone, β-butyrolactone, β-pivalolactone, γ-butyrolactone, δ-valerolactone, β-methyl-δ-valerolactone, ε-caprolactone, and the like), carbonates (e.g. trimethylene carbonate and the like), ethers (e.g. 1,3-dioxane and the like), ether esters (e.g. dioxanone and the like), and amides (e.g. ε-caprolactam and the like); hydroxycarboxylic acids other than glycolic acid such as lactic acid, 3-hydroxypropanoic acid, 3-hydroxybutanoic acid, 4-hydroxybutanoic acid, 6-hydroxycaproic acid, and the alkylesters thereof; mixtures containing substantially equimolar amounts of aliphatic diols, such as ethylene glycol and 1,4-butanediol, and aliphatic dicarboxylic acids, such as succinic acid and adipic acid, or the alkyl esters thereof. One type of these comonomers may be used alone or two or more types of these comonomers may be used in combination.

From the perspective of enhancing degradability of the polyester resin composition, the glycolic acid copolymer is preferably a glycolic acid copolymer containing at least 50 mol %, more preferably at least 55 mol %, further preferably at least 80 mol %, and particularly preferably at least 90 mol %, of the glycolic acid units per 100 mol % of total constituent units constituting the copolymer. Furthermore, the glycolic acid resin is preferably a glycolic acid homopolymer consisting only of the glycolic acid units.

The average molecular weight (Mw) of the glycolic acid resin is preferably from 10,000 to 800,000, more preferably from 20,000 to 600,000, further preferably from 30,000 to 400,000, and particularly preferably from 50,000 to 300,000. When the Mw of the glycolic acid resin is less than the lower limit, strength of the molded article obtained from the polyester resin composition can be insufficient, and on the other hand, when the Mw exceeds the upper limit, the moldability of the polyester resin composition can be poor due to increase in the melt viscosity.

The production method of such a glycolic acid resin is not particularly limited, and the glycolic acid resin can be produced by a conventional method. Also, in the present invention, commercially available glycolic acid resins can be used.

Examples of the method of producing glycolic acid resin include the following method.

(1) A method to obtain a glycolic acid resin by ring-opening polymerization using glycolide and, as needed, a comonomer (hereinafter also called the "production method of glycolic acid resin 1").

(2) A method using solid-state polymerization that is performed by producing a prepolymer via polycondensation involving dehydration or dealcoholization using glycolic acid or alkyl glycolate and, as needed, a comonomer, and then heating the obtained prepolymer to a temperature which is higher than the glass transition temperature but lower than the melting point of this prepolymer (hereinafter also called the "production method of glycolic acid resin 2").

Production Method of Glycolic Acid Resin 1

In the production method of glycolic acid resin 1, the glycolic acid resin is obtained by ring-opening polymerization using glycolide and, as needed, a comonomer. Glycolide is a bimolecular cyclic ester of glycolic acids which is a type of hydroxycarboxylic acid. Note that, in the case where the glycolic acid resin is produced using a ring-opening polymerization of glycolide, as desired, glycolic acid may be used as a part of the monomer, provided that the amount of the glycolic acid is at most 20% by mass of the amount of the glycolide. In addition, a comonomer may be used as a part of the monomer. In the case where a comonomer is used, the used amount of the comonomer is preferably decided in the manner so that the resulting glycolic acid copolymer contains the glycolic acid units in the range described above.

A cyclic monomer is preferably used as the comonomer. In addition to a bimolecular cyclic ester of other hydroxycarboxylic acids such as lactide, cyclic monomers such as lactones (e.g. β-propiolactone, β-butyrolactone, pivalolactone, γ-butyrolactone, δ-valerolactone, β-methyl-δ-valerolactone, ε-caprolactone, and the like), trimethylene carbonate, 1,3-dioxane, and the like can be used as a cyclic monomer. The preferable cyclic monomer is a bimolecular cyclic ester of hydroxycarboxylic acids other than glycolic acid. Examples of the hydroxycarboxylic acid include L-lactic acid, D-lactic acid, α-hydroxybutyric acid, α-hydroxyisobutyric acid, α-hydroxyvaleric acid, α-hydroxycaproic acid, α-hydroxyisocaproic acid, α-hydroxyheptanoic acid, α-hydroxyoctanoic acid, α-hydroxydecanoic acid, α-hydroxymyristic acid, α-hydroxystearic acid, and alkyl-substituted substances of these. Particularly preferable cyclic monomers are lactides which are bimolecular cyclic esters of lactic acids (the lactic acid may be any of L-lactic acid, D-lactic acid, racemic compound, and mixtures thereof).

In the production method of glycolic acid resin 1, ring-opening polymerization of glycolide is performed, and this ring-opening polymerization may be homopolymerization of glycolide or copolymerization of glycolide and a comonomer. Such a ring-opening polymerization is preferably performed in the presence of a little amount of a catalyst. The catalyst is not particularly limited; however, for example, tin compounds such as halogenated tin (e.g. tin dichloride, tin tetrachloride, and the like) and organic tin carboxylate (e.g. tin octanoates such as tin 2-ethylhexanoate); titanium compounds such as alkoxytitanate; aluminum compounds such as alkoxyaluminum; zirconium compounds such as zirconium acetylacetone; antimony compounds such as halogenated antimony and antimony oxide; and the like can be used. The used amount of the catalyst is, in terms of mass ratio, preferably from 1 to 1,000 ppm, and more preferably from 3 to 300 ppm, relative to the amount of cyclic ester.

The ring-opening polymerization of glycolide may be bulk polymerization or solution polymerization; however, bulk polymerization is preferable. To adjust the molecular weight, water and higher alcohols such as lauryl alcohol may be used as a molecular weight modifier. In addition, to enhance the physical properties, polyhydric alcohols such as glycerin can be added. A polymerizer for the bulk polymerization may be suitably selected from various kinds of apparatus such as an extruder type, vertical type having a paddle blade, vertical type having a helical ribbon blade, horizontal type such as an extruder type or kneader type, ampoule type, plate type, and tubular type. Various kinds of reaction vessels may be used for the solution polymerization.

The polymerization temperature can be suitably set in a range of 120° C. which is a substantial polymerization-initiating temperature to 300° C. The polymerization temperature is preferably from 130 to 270° C., more preferably from 140 to 260° C., and particularly preferably from 150 to 250° C. If the polymerization temperature is too low, the molecular weight distribution of the resulting glycolic acid resin tends to be too broad. If the polymerization temperature is too high, the resulting glycolic acid resin tends to undergo thermal decomposition. The polymerization time is in a range of 3 minutes to 20 hours, and preferably 5 minutes to 18 hours. If the polymerization time is too short, it is hard for the polymerization to sufficiently proceed, and the predetermined average molecular weight cannot be achieved. If the polymerization time is too long, the produced glycolic acid resin tends to be colored.

Furthermore, after the produced glycolic acid resin becomes a solid, solid-state polymerization may be performed as desired. The solid-state polymerization means an operation that heat-treats the glycolic acid resin, while the solid state is maintained, by heating the glycolic acid resin at a temperature lower than the melting point of the glycolic acid resin. By the solid-state polymerization, low molecular weight components such as unreacted monomers and oligomers are reacted. In addition, a part of these may be volatilized/removed. The solid-state polymerization is generally performed by heating to a predetermined temperature (1) under an inert gas atmosphere such as a nitrogen or argon atmosphere, (2) under reduced pressure, or (3) in an inert solvent such as a liquid paraffin. The solid-state polymerization is preferably performed for 1 to 100 hours, more preferably for 2 to 50 hours, and particularly preferably for 3 to 30 hours.

Production method of glycolic acid resin 2

In the production method of glycolic acid resin 2, the glycolic acid resin is obtained via solid-state polymerization by producing a prepolymer via polycondensation involving dehydration or dealcoholization using glycolic acid or alkyl glycolate and, as needed, a comonomer, and then heating the obtained prepolymer to a temperature which is higher than the glass transition temperature but lower than the melting point of this prepolymer.

The alkyl glycolate is not particularly limited but is preferably an alkyl group having from 1 to 4 carbons. Specific examples thereof include methyl glycolate, ethyl glycolate, n-propyl glycolate, isopropyl glycolate, n-butyl glycolate, isobutyl glycolate, t-butyl glycolate, and the like. As the alkyl glycolate, these groups can be used alone, or two or more types thereof can be combined for use. Of these, methyl glycolate and ethyl glycolate are particularly preferable because dealcoholization can be performed easily. In addition, comonomers described above can be used as the comonomer.

The average molecular weight of the prepolymer is typically 5,000 or greater and less than 150,000, and preferably in a range of 8,000 to 100,000. When the average molecular weight of the prepolymer is too low, it will take a long time to obtain a glycolic acid resin with high molecular weight via solid-state polymerization and thus is not economical. On the other hand, it is difficult to obtain a glycolic acid resin having the average molecular weight of 150,000 or greater via polycondensation of glycolic acid or alkyl glycolate.

When the polycondensation is performed, the use of a catalyst is not required, but, in order to increase the reaction rate, a catalyst can be added. Examples of the catalyst include tin catalysts such as tin(II) chloride, tin(IV) chloride, tin(II) sulfate, tin(II) oxide, tin(IV) oxide, tetraphenyl tin, tin(II) octanoate, tin(II) acetate, and tin(IV) acetate; titanium catalysts such as titanium(IV) chloride, isopropionate titanate, and butyl titanate; germanium catalysts such as metal germanium, germanium tetrachloride, and germanium oxide; metal oxide catalysts such as zinc oxide, antimony trioxide, lead oxide, aluminum oxide, and iron oxide; and the like. These catalysts can be used alone, or two or more types thereof can be combined for use.

In the case where the catalyst is used during polycondensation, the catalyst is added at a proportion that is, in terms of the metal atom of the catalyst, preferably from $1 \times 10^{-5}$ to $1 \times 10^{-2}$ equivalent, and more preferably from $3 \times 10^{-5}$ to $5 \times 10^{-3}$ equivalent, per 1 mol of monomer. When the added amount of the catalyst is too small, effect of polymerization time reduction will be small, and thus it is not economical from the industrial perspective. When the added amount of the catalyst is too large, commercial value of the product may be impaired because the produced polymer tends to be colored. The catalyst is added to the reaction system as is or after dissolved or dispersed in an appropriate liquid. The catalyst may be added all at once or added over a plurality of times. The catalyst may be added to the reaction system at any time until the polycondensation reaction is substantially completed.

When these catalysts are used, a phosphorus compound can be added as a coloration preventing agent. Examples of the phosphorus compound include phosphoric acid, trimethyl phosphate, triethyl phosphate, triphenyl phosphate, monoethyl polyphosphate, diethyl polyphosphate, pyrophosphoric acid, triethyl pyrophosphate, hexamethylamide pyrophosphate, phosphorous acid, triethyl phosphite, triphenyl phosphite, and the like. These phosphorus compounds can be used alone, or two or more types thereof can be combined for use. The phosphorus compound is added at a proportion that is, in terms of phosphorus atoms, preferably from 0.1 to 10 equivalent, and more preferably from 0.3 to 3 equivalent, per 1 equivalent of the metal atoms of the catalyst. When the added amount of the phosphorus compound is too small, effect of coloration prevention will be small, and when the added amount of the phosphorus compound is too large, the polycondensation reaction will proceed slower. The phosphorus compound is added to the reaction system as is or after dissolved or dispersed in an appropriate liquid. The phosphorus compound may be added all at once or added in plural times. The phosphorus compound may be added to the reaction system at any time until the polycondensation reaction is substantially completed.

The end of the reaction of dehydration or dealcoholization polycondensation of the glycolic acid or the alkyl glycolate is the time at which the molecular weight of the prepolymer reaches a predetermined molecular weight. In the case where the prepolymer has a relatively low molecular weight, the prepolymer is a liquid at the end of the polycondensation reaction and crystallizes to be a solid when cooled. In the case where the prepolymer has a relatively high molecular weight, the end of the reaction is considered to be the time when the prepolymer solidifies. After the end of the reaction, the solid-state polymerization may be performed as is; however, it is more effective to perform the solid-state polymerization after granulating the prepolymer by a treatment such as crushing in order to increase the total surface area.

In the production method of glycolic acid resin 2, a glycolic acid resin having a high molecular weight is produced via solid-state polymerization by heating the prepolymer obtained in the above described manner to a temperature which is higher than the glass transition temperature but lower than the melting point of this prepolymer. The solid-state polymerization is generally performed under an inert gas atmosphere, under reduced pressure, or in an inert solvent. To perform solid-state polymerization, form of the prepolymer is not particularly limited and may be an agglomerate, pellet, particle-like, powder, or the like. The prepolymer is preferably formed into a fine grain by crushing or the like from the perspective of accelerating the reaction due to the increase in the surface area.

The solid-state polymerization is a polymerization reaction performed by maintaining the prepolymer, literally, in a solid state. Therefore, the upper limit of the reaction temperature in the solid-state polymerization is determined based on the melting point of the prepolymer. The reaction temperature of the solid-state polymerization is typically a temperature that is 5° C. lower than the melting point of the prepolymer or lower, and preferably a temperature that is 10° C. lower than the melting point of the prepolymer or lower. If the solid-state polymerization is performed close to the melting point of the prepolymer, side reactions readily occur, and undesirable phenomena, such as reduction in molecular weight, generation of gas, and coloration, readily occur. A reaction at a temperature greater than or equal to the melting point of the prepolymer is not called a solid-state polymerization since the prepolymer is melted. In such a reaction, side reactions very easily occur, and it will be difficult to increase the molecular weight. From the perspective of increasing the reaction rate, the reaction temperature of the solid-state polymerization is preferably in a range of 100 to 230° C., and more preferably in a range of 150 to 220° C.

During the solid-state polymerization reaction, in the case where the molecular weight is increased and/or the melting point is increased due to annealing effects, the temperature of the solid-state polymerization can be increased step-wise. However, even in this case, the reaction temperature is controlled to a temperature that is lower than the melting point of the prepolymer at that time, preferably a temperature that is 5° C. lower than the melting point of the prepolymer or lower, and more preferably a temperature that is 10° C. lower than the melting point of the prepolymer or lower.

The solid-state polymerization is generally performed by heating the prepolymer to a predetermined temperature (1) under an inert gas atmosphere such as a nitrogen or argon atmosphere, (2) under reduced pressure, or (3) in an inert solvent such as a liquid paraffin. Thereby, undesirable side reactions are avoided, and it will be easy to increase the molecular weight.

The solid-state polymerization can be performed without a catalyst; however, a catalyst can be added as needed. Examples of the catalyst include tin catalysts such as tin(II) chloride, tin(IV) chloride, tin(II) sulfate, tin(II) oxide, tin (IV) oxide, tetraphenyl tin, tin(II) octanoate, tin(II) acetate, and tin(IV) acetate; titanium catalysts such as titanium(IV) chloride, isopropionate titanate, and butyl titanate; germanium catalysts such as metal germanium, germanium tetrachloride, and germanium oxide; metal oxide catalysts such as zinc oxide, antimony trioxide, lead oxide, aluminum oxide, and iron oxide; and the like. These solid-state polymerization catalysts can be used alone, or two or more types thereof can be combined for use.

When using a solid-state polymerization catalyst, the catalyst can be added at a proportion that is preferably from 0.001 to 2 parts by weight, and more preferably from 0.005 to 0.5 parts by weight, per 100 parts by weight of the prepolymer. When the added amount of the catalyst is too small, effect of the addition is small, and it is difficult to sufficiently shorten the polymerization time. When the added amount of the catalyst is too large, commercial value of the product may be impaired due to increased coloration of the produced polymer. The catalyst is added to the reaction system as is or after dissolved or mixed in an appropriate liquid. The catalyst may be added all at once or added over a plurality of times. The catalyst may be added to the reaction system at any time until the solid-state polymerization reaction is substantially completed.

When these solid-state polymerization catalysts are used, a phosphorus compound can be added as a coloration preventing agent. Examples of the phosphorus compound include phosphoric acid, trimethyl phosphate, triethyl phosphate, triphenyl phosphate, monoethyl polyphosphate, diethyl polyphosphate, pyrophosphoric acid, triethyl pyrophosphate, hexamethylamide pyrophosphate, phosphorous acid, triethyl phosphite, triphenyl phosphite, and the like. These phosphorus compounds can be used alone, or two or more types thereof can be combined for use. The phosphorus compound is added at a proportion that is, in terms of phosphorus atoms, preferably from 0.1 to 10 equivalent, and more preferably from 0.3 to 3 equivalent, per 1 equivalent of the metal atoms of the catalyst. When the added amount of the phosphorus compound is too small, effect of coloration prevention will be small, and when the added amount of the phosphorus compound is too large, the reaction will proceed slower. The phosphorus compound can be added to the reaction system as is or after dissolved or dispersed in an appropriate liquid. The phosphorus compound may be added all at once or added over a plurality of times. The phosphorus compound may be added to the reaction system at any time until the solid-state polymerization reaction is substantially completed.

As such a production method of glycolic acid resin 2, a method of producing polyglycolic acid disclosed in Japanese Unexamined Patent Application Publication No. H11-116666 can be performed.

Other Polyester Resin

A polyester resin other than the glycolic acid resin (hereinafter called "other polyester resin") can be used in combination with the polyester resin composition of the present invention. The content of such an other polyester resin is less than 50% by mass, preferably 45% by mass or less, more preferably 30% by mass or less, and further preferably 20% by mass or less, and particularly preferably 10% by mass or less, from the perspective of enhancing the degradability of the polyester resin composition.

The other polyester resin is not particularly limited, and examples thereof include degradable polyester resins such as lactic acid resins, polyethylene terephthalate copolymers, polybutylene succinate, polycaprolactone, and polyhydroxyalkanoate. One type of these degradable polyester resins may be used alone or two or more types of these degradable polyester resins may be used in combination. Among these degradable polyester resins, from the perspective of enhancing the degradability of the polyester resin composition, the lactic acid resins are preferable.

The lactic acid resin is a polymer having lactic acid units (—OCH(CH$_3$)—CO—). Examples of the lactic acid resin include polylactic acid consisting only of the lactic acid units, and lactic acid copolymers containing lactic acid units and constituent units derived from other monomer (hereinafter called "comonomer"). Examples of the polylactic acid include poly-D-lactic acid consisting of D-lactic acid units (homopolymer of the D-lactic acid), poly-L-lactic acid consisting only of L-lactic acid units (homopolymer of the L-lactic acid), and poly-DL-lactic acid consisting of D-lactic acid units and L-lactic acid units (copolymer of the D-lactic acid and the L-lactic acid). The lactic acid copolymer is preferably a lactic acid copolymer containing at least 50 mol % of the lactic acid units per 100 mol % of total constituent units constituting the copolymer. Also in the case of lactic acid copolymers, the lactic acid units may be only D-lactic acid units, may be only L-lactic acid units, or may be a mixture of the D-lactic acid units and the L-lactic acid units.

Note that the lactic acid unit is a unit derived from a monomer that imparts a —OCH(CH$_3$)—CO— structure to the polymer by polymerization, and not necessarily a unit derived from lactic acid. For example, in the present invention, the lactic acid resin includes a polymer derived from lactide which is a bimolecular cyclic ester of lactic acids.

Examples of the comonomer include the comonomers exemplified as the glycolic acid copolymer (except for lactic acid and lactide), glycolic acid, and glycolide. From the perspective of enhancing degradability of the polyester resin composition, the lactic acid copolymer is preferably a lactic acid copolymer containing at least 50 mol %, more preferably at least 55 mol %, further preferably at least 80 mol %, and particularly preferably at least 90 mol %, of the lactic acid units per 100 mol % of total constituent units constituting the copolymer. Furthermore, the lactic acid resin is preferably a lactic acid homopolymer consisting only of the lactic acid units.

The average molecular weight (Mw) of the lactic acid resin is preferably from 10,000 to 800,000, more preferably from 20,000 to 600,000, further preferably from 30,000 to 400,000, and particularly preferably from 50,000 to 300,000. When the Mw of the lactic acid resin is less than the lower limit, strength of the molded article formed from the polyester resin composition can be insufficient, and, on the other hand, when the Mw exceeds the upper limit, the moldability of the polyester resin composition can be poor due to an increase in the melt viscosity.

The production method of such a lactic acid resin is not particularly limited, and the lactic acid resin can be produced by a conventional method. Also, in the present invention, commercially available lactic acid resins can be used.

Degradation Accelerator

The degradation accelerator used in the present invention is a carboxylic acid anhydride, and as needed, phosphorus compound can be used in combination with the carboxylic acid anhydride. By adding a carboxylic acid anhydride as the degradation accelerator, a polyester resin composition having excellent degradability even at low temperatures (e.g. less than 60° C., and preferably less than or equal to 50° C.) can be obtained. Furthermore, this polyester resin composition also has excellent storing properties. In addition, by using a phosphorus compound in combination with the carboxylic acid anhydride, the degradability tends to further increase.

Carboxylic Acid Anhydride

The carboxylic acid anhydride used in the present invention is not particularly limited; however, from the perspective of heat resistance that can tolerate the temperature at which the polyester resin composition of the present invention is molded and from the perspective of compatibility with the polyester resin composition, the carboxylic acid anhydride is preferably an aliphatic monocarboxylic acid anhydride (preferably an aliphatic monocarboxylic acid anhydride having two alkyl groups having from 6 to 20 carbons) such as a hexanoic acid anhydride, an octanoic acid anhydride, a decanoic acid anhydride, a lauric acid anhydride, a myristic acid anhydride, a palmitic acid anhydride, and a stearic acid anhydride; an aromatic monocarboxylic acid anhydride such as a benzoic acid anhydride; an aliphatic dicarboxylic acid anhydride (preferably an aliphatic dicarboxylic acid anhydride having a saturated or unsaturated hydrocarbon chain having from 2 to 20 carbons) such as a succinic acid anhydride and a maleic acid anhydride; an aromatic dicarboxylic acid anhydride such as a phthalic anhydride; an aromatic tricarboxylic acid anhydride such as a trimellitic acid anhydride; an alicyclic dicarboxylic acid anhydride such as a tetrahydrophthalic anhydride; an aliphatic tetracarboxylic dianhydride such as a butanetetracarboxylic dianhydride; or an aromatic tetracarboxylic dianhydride such as a 3,3',4,4'-benzophenone tetracarboxylic dianhydride, a diphenylsulfone tetracarboxylic dianhydride, a biphenyl tetracarboxylic dianhydride, ethyleneglycol bisanhydrotrimellitate, and glycerin bisanhydrotrimellitate monoacetate. More preferably, the carboxylic acid anhydride is a carboxylic acid anhydride having a ring structure, further preferably the carboxylic acid anhydride is an aromatic monocarboxylic acid anhydride, an aromatic dicarboxylic acid anhydride, an aromatic tricarboxylic acid anhydride, or an aromatic tetracarboxylic dianhydride, and particularly preferably a phthalic anhydride, a trimellitic acid anhydride, or a 3,3',4,4'-benzophenone tetracarboxylic dianhydride. One type of these carboxylic acid anhydrides may be used alone or two or more types of these carboxylic acid anhydrides may be used in combination.

In addition, among these carboxylic acid anhydrides, a carboxylic acid anhydride that is capable of increasing the glass transition temperature (Tg) of the polyester resin composition higher than the Tg of the glycolic acid resin is preferably used. An example of such a carboxylic acid anhydride includes a 3,3',4,4'-benzophenone tetracarboxylic dianhydride. When the carboxylic acid anhydride that is capable of increasing the Tg is used, handleability upon molding the polyester resin composition tends to be enhanced. For example, in the case where fibers are produced using the polyester resin composition, although agglutination can be a problem during the fiber production, such agglutination tends to hardly occur when Tg is increased. Note that, the Tg of the glycolic acid resin itself is typically from −40 to 45° C., and for example, in the case where the glycolic acid resin is a glycolic acid homopolymer, Tg is typically from 35 to 45° C. However, when a 3,3'4,4'-benzophenone tetracarboxylic dianhydride is used as the degradation accelerator, a polyester resin composition having the Tg of 45 to 55° C. can be obtained.

Phosphorus Compound

The phosphorus compound used in the present invention is not particularly limited; however, the phosphorus compound is preferably an organic phosphorus compound such as phosphate and phosphite. Of these, the organic phosphorus compound having at least one structure selected from the group consisting of a long-chain alkyl group having from 8 to 24 carbons, an aromatic ring, and a pentaerythritol skeleton is more preferable. One type of these phosphorus compounds may be used alone or two or more types of these phosphorus compounds may be used in combination.

Examples of the phosphate having a long-chain alkyl group having from 8 to 24 carbons include mono- or di-stearyl acid phosphate or a mixture thereof, di-2-ethylhexyl acid phosphate, and the like. Examples of the phosphite having an aromatic ring include tris(nonylphenyl)phosphite and the like. Examples of the phosphite having a pentaerythritol skeleton structure include cyclic neopentanetetraylbis(2,6-di-tert-butyl-4-methylphenyl)phosphite, cyclic neopentanetetraylbis(2,4-di-tert-butylphenyl)phosphite, cyclic neopentanetetraylbis(octadecyl)phosphite, and the like.

<Polyester Resin Composition>

The polyester resin composition of the present invention contains from 0.5 to 50 parts by mass of a carboxylic acid anhydride as the degradation accelerator, and as needed, from 0.01 to 10 parts by mass of a phosphorus compound per 100 parts by mass of the polyester resin.

When the content of the carboxylic acid anhydride is less than the lower limit, degradability at low temperatures (e.g. less than 60° C., and preferably less than or equal to 50° C.) will not be sufficiently exhibited. On the other hand, when the content exceeds the upper limit, moldability of the polyester resin composition will be degraded. In addition, from these perspectives, the content of the carboxylic acid anhydride is preferably from 1 to 50 parts by mass, and more preferably from 3 to 50 parts by mass, per 100 parts by mass of the polyester resin.

In addition, by using a phosphorus compound and a carboxylic acid anhydride in a combination as the degradation accelerator, the degradability of the polyester resin composition at low temperatures tends be further increased; however, when the content of the phosphorus compound exceeds the upper limit, molecular weight tends to be decreased during the molding and the surface quality tends to be impaired due to bleed out. On the other hand, when the content is less than the lower limit, the effect of adding the phosphorus compound tends not to be sufficiently exhibited. Also, from the perspective of increasing the degradability of the polyester resin composition at low temperatures, the content of the phosphorus compound is more preferably from 0.1 to 10 parts by mass, and further preferably from 0.5 to 10 parts by mass, per 100 parts by mass of the polyester resin.

In general, when a glycolic acid resin is degraded in a system, the pH of the system will be reduced due to an increase in the amount of the carboxyl group present in the system. Conventionally, it is known that an acid (e.g. carboxylic acid), inorganic substance, and the like are used as an additive for accelerating the degradation of the polyester resin composition containing a glycolic acid resin. Since the present invention uses a carboxylic acid anhydride as the degradation accelerator, the initial pH of the system can be set high compared to the case, for example, where an acid is used as the degradation accelerator. In addition, compared to conventional degradation accelerators (i.e. degradation accelerators other than a carboxylic acid anhydride and phosphorus compound), a carboxylic acid anhydride suppresses the degradation of a resin by reaction and water absorption under a condition where the amount of water is little. Therefore, in spite of the polyester resin composition of the present invention exhibiting excellent degradability in a condition where the amount of water is large, the polyester resin composition of the present invention can suppress the degradation of the glycolic acid resin in a condition where the amount of water is a little such as conditions in which a polyester resin composition is produced or molded, or a condition in which a molded article produced by the molding is stored.

In the polyester resin composition of the present invention, a conventionally known thermal stabilizer may be compounded in order to suppress thermal degradation caused when the polyester resin composition is molded. Examples of such a thermal stabilizer include metal carbonates such as calcium carbonate and strontium carbonate; hydrazine compounds typically known as polymerization catalyst deactivators having —CONHNH—CO— units such as bis[2-(2-hydroxybenzoyl)hydrazine]dodecanoic acid and N,N'-bis[3-(3,5-di-t-butyl-4-hydroxyphenyl)propionyl]hydrazine; triazole compounds such as 3-(N-salicyloyl)amino-1,2,4-triazole; triazine compounds; and the like. The compounded amount of the thermal stabilizer is typically 3 parts by mass or less, and preferably from 0.001 to 1 part by mass, more preferably from 0.005 to 0.5 parts by mass, and particularly preferably from 0.01 to 0.1 parts by mass (100 to 1,000 ppm) per 100 parts by mass of the polyester resin.

In addition, in the polyester resin composition of the present invention, a conventionally known carboxyl group-end capping agent or hydroxyl group-end capping agent may be compounded in order to enhance the storage properties. Examples of such an end capping agent are not particularly limited as long as the compound has a carboxyl group-end capping effect and hydroxyl group-end capping effect. Examples of the carboxyl group-end capping agent include carbodiimide compounds such as N,N-2,6-diisopropyl phenyl carbodiimide; oxazoline compounds such as 2,2'-m-phenylene bis(2-oxazoline), 2,2'-p-phenylene bis(2-oxazoline), 2-phenyl-2-oxazoline, and styrene-isopropenyl-2-oxazoline; oxazine compounds such as 2-methoxy-5,6-dihydro-4H-1,3-oxazine; epoxy compounds such as N-glycidyl phthalimide, cyclohexene oxide, and tris(2,3-epoxypropyl)isocyanurate; and the like. Among these carboxyl group-end capping agents, carbodiimide compound is preferable. Although any of aromatic, alicyclic, and aliphatic carbodiimide compounds can be used, aromatic carbodiimide compound is particularly preferable, and specifically, a compound with high purity is excellent at enhancing the storage properties. In addition, examples of the hydroxyl group-end capping agent include diketene compounds, isocyanates, and the like. The compounded amount of such an end capping agent is typically from 0.01 to 5 parts by mass, preferably from 0.05 to 3 parts by mass, and more preferably from 0.1 to 1 part by mass, per 100 parts by mass of the polyester resin.

Furthermore, depending on the intended use, the polyester resin composition of the present invention may further contain resins other than polyester resin, photostabilizers, inorganic fillers, organic fillers, plasticizers, nucleating agents, desiccants, waterproofing agents, water repellants, lubricants, release agents, coupling agents, oxygen absorbers, pigments, dyes, and other optional components. In particular, in the case where the molded article formed from the polyester resin composition of the present invention is used as a component in a well-treatment fluid such as a fracturing fluid used in well drilling or completion for petroleum or natural gas recovery described below, the polyester resin composition preferably contains, resins other than the polyester resin, thermal stabilizers, photostabilizers, inorganic fillers, organic fillers, plasticizers, nucleating agents, desiccants, waterproofing agents, water repellants, and/or lubricants as an optional component.

Examples of the resin other than polyester resin include thermoplastic resins such as polyethylene, polypropylene, polyvinyl alcohol, polyamide, polyesteramide, acrylic resins, styrene copolymers, polyphenylenesulfide resins, polyetheretherketone resins, polycarbonate, polyacetal, polysulfone, polyphenylene ether, polyimide, polyetherimide, polysaccharide, and cellulose ester resins; thermosetting resins such as phenolic resins, melamine resins, silicone resins, and epoxy resins; flexible thermoplastic resins such as flexible polyolefin polymers including ethylene/glycidyl-methacrylate copolymers, ethylene/propylene copolymers, and ethylene/butene-1 copolymers, and the like, as well as various core-shell elastomers, and polyamide elastomers. One type of these resins may be used alone or two or more types of these resins may be used in combination.

The polyester resin composition of the present invention is typically used in fields that require degradability. Therefore, the resin other than polyester resin preferably has degradability. Polyamide, polyesteramide, polyether, polysaccharide, polyvinyl alcohol are preferable as such a resin.

Such a resin other than polyester resin is preferably compounded so that from 99 to 50 parts by mass of the glycolic acid resin and from 1 to 50 parts by mass of the resin other than polyester resin are contained in the polyester resin per 100 parts by mass total of this resin and the polyester resin.

The method of producing the polyester resin composition of the present invention is not particularly limited. An example thereof is a method performed by mixing a carboxylic acid anhydride and, as needed, a phosphorus compound as degradation accelerators and, as needed, a thermal stabilizer, an end capping agent, and other optional components into a polyester resin containing a glycolic acid resin and, as needed, the resin other than polyester resin, and then melt-kneading the mixture at a temperature greater than or equal to the melting point of the glycolic acid resin. In particular, since the polyester resin composition of the present invention contains a carboxylic acid anhydride as the degradation accelerator, it is advantageous that the molecular weight reduction of the glycolic acid resin caused by melt-kneading will be suppressed compared to the case where a conventional degradation accelerator such as a typical carboxylic acid (i.e. degradation accelerator other than a carboxylic acid anhydride and phosphorus compound) is contained.

<Molded Article>

The molded article of the present invention is formed from the polyester resin composition of the present invention. Since the polyester resin composition of the present invention has excellent degradability as well as excellent gas barrier properties, heat resistance, and mechanical strength imparted by glycolic acid resin, the polyester resin composition can be used in various applications such as packaging materials, industrial materials, and medical fibers. Furthermore, since the polyester resin composition of the present invention also has excellent degradability not only at high temperatures (e.g. 60° C. or higher) but also at low temperatures (e.g. less than 60° C., and preferably less than or equal to 50° C.), the polyester resin composition can be used as a component in a well-treatment fluid such as various liquid fluids used in well drilling and completion (i.e. fracturing fluids).

The form of the molded article of the present invention varies depending on the intended use of the molded article of the present invention, and examples of the forms include powder, a pellet, a film, and a fiber. Note that the method of obtaining the molded article of the present invention is not particularly limited, and examples of the method include a method of obtaining a molded article of the present invention by directly molding the melted polyester resin composition of the present invention into a desired form, and a method of obtaining a molded article of the present invention by molding a pellet from the melted polyester resin composition of the present invention and then subjecting the pellet to a secondary molding to form a desired form.

Such a molded article of the present invention can be used in a well-treatment fluid such as various liquid fluids used in well drilling for petroleum or natural gas recovery (i.e. fracturing fluids). In particular, the molded article can be used in at least one type of well-treatment fluid selected from the group consisting of a drilling fluid, a fracturing fluid, a cementing fluid, a temporary plugging fluid, and a completion fluid.

<Well-Treatment Fluid>

The well-treatment fluid of the present invention is a well-treatment fluid containing the molded article of the present invention. Such a well-treatment fluid can be used as at least one type of well-treatment fluid selected from the group consisting of a drilling fluid, a fracturing fluid, a cementing fluid, a temporary plugging fluid, and a completion fluid.

The form of the molded article contained in the well-treatment fluid of the present invention is not particularly limited, and examples of the form include powder, a pellet, a film, and a fiber. Examples of the powder include powder having a ratio of major axis/minor axis of 1.9 or less, and a 50 wt. % cumulative mean diameter of 1 to 1000 μm. Examples of the pellet include a pellet having a length in the longitudinal direction of 1 to 10 mm, and an aspect ratio of 1 or greater and less than 5. Examples of the film include a film piece having an area of 0.01 to 10 cm$^2$, and a thickness of 1 to 1000 μm. Examples of the fiber include a short fiber having a ratio of length/cross-sectional diameter (aspect ratio) of 10 to 2000, and a minor axis of 5 to 95 μm.

The molded article of the present invention can enhance the dispersibility of a proppant by, for example when the molded article is compounded in a fracturing fluid as a fiber, compounding the fiber at a concentration of 0.05 to 100 g/L, and preferably from 0.1 to 50 g/L, in the fracturing fluid.

Fibers compounded in a fracturing fluid may become functionally unnecessary during the construction and/or after the completion of the well; however, at this time, if the fiber formed from the polyester resin composition of the present invention is used, collection or disposal, that is usually necessary, will be unnecessary or easy. In other words, since the fiber has excellent biodegradability and hydrolyzability, for example, even if the fiber is left in a fracture or the like formed under the ground, the fiber will be biodegraded by microorganisms present in the ground, and/or hydrolyzed by moisture in the soil, and thus disappear in a short time. Therefore, collection of the fibers will be unnecessary. In particular, since the polyester resin composition of the present invention exhibits excellent degradability not only at high temperatures (e.g. 60° C. or higher) but also at low temperatures (e.g. less than 60° C., and preferably less than or equal to 50° C.), the fiber will disappear in a short time in soil environment at relatively low temperatures as well as in soil environment at high temperature and high pressure. Furthermore, depending on the conditions, the fiber can be hydrolyzed in a shorter time by injecting an alkaline solution into the ground where the fibers remain, and then bringing the alkaline solution and the fibers into contact. In addition, the fiber may be easily biodegraded or hydrolyzed (at a relatively low temperature) after collecting the fiber with the fracturing fluid on the ground.

Since the molded article of the present invention has excellent hydrolyzability not only at high temperatures (e.g. 60° C. or higher) but also at low temperatures (e.g. less than 60° C., and preferably less than or equal to 50° C.), in the case where the molded article becomes functionally unnecessary, the molded article can disappear in a short period of time by hydrolysis at a relatively low temperature after being collected and brought up to the ground, or in soil environment at relatively low temperatures as well as in soil environment at high temperature and high pressure. Furthermore, the molded article has acid releasability, and it is also possible to use the molded article for acid treatment during well construction to achieve effects that are advantageous for well stimulation methods (i.e. a method that facilitates fracturing of rocks and/or increases permeability of oil layers by dissolving rocks via a treatment of bringing the acid and the oil layers into contact).

In addition to the molded article of the present invention, the well-treatment fluid of the present invention can contain various components and/or additives that are typically contained in well-treatment fluids. For example, in a fracturing fluid that is used in hydraulic fracturing (fracturing), in addition to compounding the molded article of the present invention (e.g. at a concentration of 0.05 to 100 g/L), the fracturing fluid can contain: as a solvent or dispersing medium, water and/or organic solvent as a main component (approximately from 90 to 95% by mass); as a support body (proppant), sand, glass beads, ceramic particles, resin-coated sand, and the like (approximately from 9 to 5% by mass); and various additives (approximately from 0.5 to 1% by mass) such as gelling agents, scale inhibitors, acids for dissolving rocks or the like, and friction reducing agents. The well-treatment fluid containing the molded article, e.g. a well-treatment fluid containing the fiber described above at a concentration of 0.05 to 100 g/L, has excellent properties as a well-treatment fluid such as a drilling fluid, a fracturing fluid, a cementing fluid, a temporary plugging fluid, and a completion fluid, as well as having an effect of significantly facilitating the collection and/or disposal after use.

EXAMPLES

The present invention will be described in further detail hereinafter based on working examples and comparative examples, but the present invention is not limited to the following examples. Properties of used resins or obtained polyester resin compositions in the examples were measured according to the methods described below.

<Measurement of Molecular Weight>

The molecular weight of resins (polyglycolic acid, polylactic acid, and the like) was measured using a gel permeation chromatography (GPC) under the following conditions.

GPC Measurement Conditions

Device: Shodex-104, manufactured by Showa Denko K.K.

Columns: two HFIP-606M and, as a precolumn, one HFIP-G were connected in series

Column temperature: 40° C.

Eluent: hexafluoroisopropanol (HFIP) solution in which 5 mM of sodium trifluoroacetate was dissolved Flow rate: 0.6 mL/min Detector: RI (differential refractive index) detector Molecular weight calibration: five types of standard polymethylmethacrylates having different molecular weights were used <Degradation Test (Measurement of Mass Loss)>

In 50 mL of ion exchanged water in a glass container, 1 g of a sample (a polyester resin composition (including fibers), polyglycolic acid, or a polylactic acid) was immersed, and maintained in a thermostatic chamber at 40° C. for one week or two weeks. Thereafter, gravity filtration was performed, and a solid component remaining on the filter paper was left for one day at room temperature. Then, the solid component was further dried under a nitrogen atmosphere of 80° C. The mass of the solid component after drying was measured, and a proportion relative to the mass (1 g) of the sample before being maintained at 40° C. (mass losses after being maintained at 40° C. for one week and two weeks) was determined.

<Measurement of Glass Transition Temperature (Tg)>

10 mg of a sample (polyester resin composition, polyglycolic acid, or polylactic acid) was set in a differential scanning calorimeter (DSC-822e, manufactured by Mettler-Toledo). A midpoint glass transition temperature corresponding to the transition region of a glass to rubber transition in the case where the sample was heated from 0° C. to approximately 100° C. at a heating rate of 20° C./min in a nitrogen atmosphere (40 mL/min) was used as the glass transition temperature (Tg).

In addition, fibers were produced according to the method described below.

<Production of Fibers>

A sample (polyester resin composition, polyglycolic acid, or polylactic acid) was placed in a single screw extruder having a cylinder diameter of 20 mm and melted at 215 to 250° C. The cylinder temperature of the extruder was set to 215 to 250° C., and the head temperature, the gear pump temperature, and the spin pack temperature were set to 250° C.

The melted sample was discharged from a nozzle with 24 holes (hole diameter: 0.20 mm) using a gear pump, air-cooled in a cooling tower (approximately 5° C.), and solidified into a yarn-shape to obtain undrawn yarn. Thereafter, the undrawn yarn was drawn to three times the length at a drawing temperature of 65° C. to obtain drawn yarn.

Working Example 1

In 100 parts by mass of polyglycolic acid (PGA; Kuredux, manufactured by Kureha Corporation; average molecular weight (Mw): 176,000), 1 part by mass of a 3,3',4,4'-benzophenone tetracarboxylic dianhydride (BTDA) was compounded. Then, the mixture was supplied into a feed part of a twin screw extruder (2D25S, manufactured by Toyo Seiki Seisaku-sho, Ltd.) with a screw part temperature being set at 200 to 240° C. and melt-kneaded to obtain a pellet-like polyglycolic acid resin composition. This polyglycolic acid resin composition was subjected to the degradation test according to the method described above, and mass loss after being maintained at 40° C. for two weeks was determined. The results are shown in Table 1.

Working Examples 2 to 6

Pellet-like polyglycolic acid resin compositions were prepared in the same manner as in Working Example 1 except for changing the compounded amounts of BTDA to the amounts shown in Table 1. The obtained polyglycolic acid resin compositions were subjected to the degradation test according to the method described above, and mass losses after being maintained at 40° C. for one week (Working Examples 3 to 5) and two weeks (Working Examples 2 to 6) were determined. The results are shown in Table 1. In addition, the glass transition temperatures of the polyglycolic acid resin compositions obtained in Working Examples 3 to 5 were measured according to the method described above, and the glass transition temperatures were 52° C. (Working Example 3), 52° C. (Working Example 4), and 53° C. (Working Example 5), respectively. Furthermore, drawn yarn produced using the polyglycolic acid resin composition obtained in Working Example 3 was subjected to the degradation test according to the method described above. The mass loss after being maintained at 40° C. for one week was determined, and the result was 15%.

Working Examples 7 and 8

Pellet-like polyglycolic acid resin compositions were prepared in the same manner as in Working Example 1 except for using 5 parts by mass and 30 parts by mass, respectively, of a phthalic anhydride in place of the BTDA. The obtained polyglycolic acid resin compositions were subjected to the degradation test according to the method described above, and mass losses after being maintained at 40° C. for one week and two weeks were determined. The results are shown in Table 1.

Working Examples 9 and 10

Pellet-like polyglycolic acid resin compositions were prepared in the same manner as in Working Example 1 except for using 5 parts by mass and 30 parts by mass, respectively, of a trimellitic acid anhydride in place of the BTDA. The obtained polyglycolic acid resin compositions were subjected to the degradation test according to the method described above, and mass losses after being maintained at 40° C. for one week and two weeks were determined. The results are shown in Table 1.

Working Examples 11 to 14

Pellet-like polyglycolic acid resin compositions were prepared in the same manner as in Working Example 1 except for using 10 parts by mass of a benzoic acid anhydride (Working Example 11), ethyleneglycol bisanhydrotrimellitate (TMEG; Working Example 12), butanetetracarboxylic dianhydride (BT; Working Example 13), or diphenylsulfone tetracarboxylic dianhydride (DSDA; Working Example 14) in place of the BTDA. The obtained polyglycolic acid resin compositions were subjected to the degradation test according to the method described above, and mass losses after being maintained at 40° C. for one week (Working Example 11) and two weeks (Working Examples 11 to 14) were determined. The results are shown in Table 1.

Working Example 15

A pellet-like polyglycolic acid resin composition was prepared in the same manner as in Working Example 4 except for using 90 parts by mass of PGA and 10 parts by mass of polylactic acid (PLA; PLA polymer 4032D, manufactured by Nature Works LLC; average molecular weight (Mw): 256,000) in place of 100 parts by mass of the PGA. The obtained polyglycolic acid resin composition was subjected to the degradation test according to the method described above, and mass loss after being maintained at 40° C. for two weeks was determined. The results are shown in Table 1.

Working Examples 16 and 17

Pellet-like polyglycolic acid resin compositions were prepared in the same manner as in Working Example 15 except for changing the compounded amounts of PGA and PLA to the amounts shown in Table 1. The obtained polyglycolic acid resin compositions were subjected to the degradation test according to the method described above, and mass losses after being maintained at 40° C. for two weeks were determined. The results are shown in Table 1.

Working Examples 18 to 22

Pellet-like polyglycolic acid resin compositions were prepared in the same manner as in Working Examples 1 to 5 except for further compounding 0.05 parts by mass of a mixture of distearyl acid phosphate and monostearyl acid phosphate (ADK STAB AX-71, manufactured by Adeka Corporation). The obtained polyglycolic acid resin compositions were subjected to the degradation test according to the method described above, and mass losses after being maintained at 40° C. for two weeks were determined. The results are shown in Table 1.

Working Examples 23 to 25

Pellet-like polyglycolic acid resin compositions were prepared in the same manner as in Working Examples 18 to 20 except for changing the compounded amount of ADK STAB AX-71 to 0.5 parts by mass. The obtained polyglycolic acid resin compositions were subjected to the degradation test according to the method described above, and mass losses after being maintained at 40° C. for two weeks were determined. The results are shown in Table 1.

Comparative Example 1

Pellet-like polyglycolic acid was prepared in the same manner as in Working Example 1 except for not compounding the BTDA. The obtained polyglycolic acid was subjected to the degradation test according to the method described above. The mass loss after being maintained at 40° C. for two weeks was determined. The results are shown in Table 1. In addition, the glass transition temperature of the obtained polyglycolic acid was measured according to the method described above, and the glass transition temperature was 43° C.

Furthermore, fiber was produced from the obtained polyglycolic acid according to the method described above. The obtained drawn yarn of the fiber was subjected to the degradation test according to the method described above, and the mass loss after being maintained at 40° C. for one week was determined. The mass loss was less than 5%.

Comparative Example 2

Pellet-like polylactic acid was prepared in the same manner as in Comparative Example 1 except for using PLA in place of the PGA. The obtained polylactic acid was subjected to the degradation test according to the method described above. The mass loss after being maintained at 40° C. for two weeks was determined. The results are shown in Table 1.

Furthermore, fiber was produced from the obtained polylactic acid according to the method described above. The obtained drawn yarn of the fiber was subjected to the degradation test according to the method described above, and the mass loss after being maintained at 40° C. for one week was determined. The mass loss was less than 5%.

Comparative Example 3

Pellet-like polyglycolic acid resin composition was prepared in the same manner as in Working Example 1 except for using 10 parts by mass of adipic acid in place of the BTDA. The obtained polyglycolic acid resin compositions were subjected to the degradation test according to the method described above, and mass losses after being maintained at 40° C. for two weeks were determined. The results are shown in Table 1.

TABLE 1

| | Polyester resin | | Carboxylic acid | | Phosphorus compound | | Mass loss (%) (maintained at 40° C.) | |
|---|---|---|---|---|---|---|---|---|
| | Type | Compounded amount (part by mass) | Type | Compounded amount (part by mass) | Type | Compounded amount (part by mass) | After 1 week | After 2 weeks |
| Working Example 1 | PGA | 100 | BTDA | 1 | — | — | — | 10 |
| Working Example 2 | PGA | 100 | BTDA | 3 | — | — | — | 18 |
| Working Example 3 | PGA | 100 | BTDA | 5 | — | — | 12 | 23 |
| Working Example 4 | PGA | 100 | BTDA | 10 | — | — | 20 | 27 |
| Working Example 5 | PGA | 100 | BTDA | 30 | — | — | 33 | 38 |
| Working Example 6 | PGA | 100 | BTDA | 50 | — | — | — | 49 |
| Working Example 7 | PGA | 100 | Phthalic anhydride | 5 | — | — | 11 | 21 |
| Working Example 8 | PGA | 100 | Phthalic anhydride | 30 | — | — | 30 | 35 |
| Working Example 9 | PGA | 100 | Trimellitic acid anhydride | 5 | — | — | 14 | 24 |
| Working Example 10 | PGA | 100 | Trimellitic acid anhydride | 30 | — | — | 36 | 41 |
| Working Example 11 | PGA | 100 | Benzoic acid anhydride | 10 | — | — | 10 | 23 |
| Working Example 12 | PGA | 100 | TMEG | 10 | — | — | — | 27 |
| Working Example 13 | PGA | 100 | BT | 10 | — | — | — | 27 |
| Working Example 14 | PGA | 100 | DSDA | 10 | — | — | — | 26 |
| Working Example 15 | PGA PLA | 90 10 | BTDA | 10 | — | — | — | 30 |
| Working Example 16 | PGA PLA | 70 30 | BTDA | 10 | — | — | — | 27 |
| Working Example 17 | PGA PLA | 50 50 | BTDA | 10 | — | — | — | 23 |
| Working Example 18 | PGA | 100 | BTDA | 1 | AX-71 | 0.05 | — | 16 |
| Working Example 19 | PGA | 100 | BTDA | 3 | AX-71 | 0.05 | — | 23 |
| Working Example 20 | PGA | 100 | BTDA | 5 | AX-71 | 0.05 | — | 25 |
| Working Example 21 | PGA | 100 | BTDA | 10 | AX-71 | 0.05 | — | 30 |
| Working Example 22 | PGA | 100 | BTDA | 30 | AX-71 | 0.05 | — | 44 |
| Working Example 23 | PGA | 100 | BTDA | 1 | AX-71 | 0.5 | — | 12 |

TABLE 1-continued

| | Polyester resin | | Carboxylic acid | | Phosphorus compound | | Mass loss (%) (maintained at 40° C.) | |
|---|---|---|---|---|---|---|---|---|
| | Type | Compounded amount (part by mass) | Type | Compounded amount (part by mass) | Type | Compounded amount (part by mass) | After 1 week | After 2 weeks |
| Working Example 24 | PGA | 100 | BTDA | 3 | AX-71 | 0.5 | — | 23 |
| Working Example 25 | PGA | 100 | BTDA | 5 | AX-71 | 0.5 | — | 28 |
| Comparative Example 1 | PGA | 100 | — | — | — | — | — | <10 |
| Comparative Example 2 | PLA | 100 | — | — | — | — | — | <5 |
| Comparative Example 3 | PGA | 100 | Adipic acid | 10 | — | — | — | 26 |

In the mass loss of Comparative Examples 1 and 2, "<10" and "<5" respectively indicate "less than 10%" and "less than 5%".

As is clear from the results shown in Table 1, in the cases where a carboxylic acid anhydride was added to a polyester resin containing at least 50% by mass of polyglycolic acid (Working Examples 1 to 25), the degradability was enhanced (increase in mass loss) at 40° C. compared to the case where only polyglycolic acid was used (Comparative Example 1) or the case where only polylactic acid was used (Comparative Example 2). In particular, in the cases where a carboxylic acid anhydride and a phosphorus compound were used in combination (Working Examples 18 to 25), the degradability was enhanced (increase in mass loss) at 40° C. compared to the cases where only a carboxylic acid anhydride was added (Working Examples 1 to 6).

Working Example 26

Pellet-like polyglycolic acid resin composition was prepared in the same manner as in Working Example 9 except for changing the compounded amount of a trimellitic acid anhydride to 10 parts by mass. Fiber formed from this polyglycolic acid resin composition was produced according to the method described above. The drawn yarn was subjected to an accelerated storage test by adjusting the moisture content of the obtained drawn yarn of the fiber to 0.2 to 0.3% and then storing 0.5 g of the drawn yarn sealed in an aluminum pack for 7 days in a thermostatic chamber at 80° C.

After the completion of the test, the drawn yarn was dissolved in an HFIP solution, and average molecular weight (Mw) was measured according to the method described above. This average molecular weight (Mw) was used as the average molecular weight (Mw) of the drawn yarn after the storage test. The results are shown in Table 2.

Working Example 27

Pellet-like polyglycolic acid resin composition was prepared in the same manner as in Working Example 18 except for changing the compounded amounts of BTDA to 3 parts by mass and ADK STAB AX-71 to 0.1 parts by mass. Fiber was produced in the same manner as in Working Example 26 except for using the polyglycolic acid resin composition prepared in Working Example 27, and the average molecular weight (Mw) of the drawn yarn of the fiber after the storage test was determined. The results are shown in Table 2.

Working Example 28

Fiber was produced in the same manner as in Working Example 26 except for using the polyglycolic acid resin composition prepared in Working Example 4, and the average molecular weight (Mw) of the drawn yarn of the fiber after the storage test was determined. The results are shown in Table 2.

Comparative Example 4

Fiber was produced in the same manner as in Working Example 26 except for using the polyglycolic acid prepared in Comparative Example 1, and the average molecular weight (Mw) of the drawn yarn of the fiber after the storage test was determined. The results are shown in Table 2.

Comparative Example 5

Fiber was produced in the same manner as in Working Example 26 except for using the polyglycolic acid resin composition prepared in Comparative Example 3, and the average molecular weight (Mw) of the drawn yarn of the fiber after the storage test was determined. The results are shown in Table 2.

TABLE 2

| | Polyester resin | | Carboxylic acid anhydride | | Phosphorus compound | | Average molecular weight (after storing for 7 days at 80° C.) |
|---|---|---|---|---|---|---|---|
| | Type | Compounded amount (part by mass) | Type | Compounded amount (part by mass) | Type | Compounded amount (part by mass) | |
| Working Example 26 | PGA | 100 | Trimellitic acid anhydride | 10 | — | — | $7.2 \times 10^4$ |
| Working Example 27 | PGA | 100 | BTDA | 3 | AX-71 | 0.1 | $8.6 \times 10^4$ |
| Working Example 28 | PGA | 100 | BTDA | 10 | — | — | $9.3 \times 10^4$ |

TABLE 2-continued

|  | Polyester resin | | Carboxylic acid anhydride | | Phosphorus compound | | Average molecular weight (after storing for 7 days at 80° C.) |
|---|---|---|---|---|---|---|---|
|  | Type | Compounded amount (part by mass) | Type | Compounded amount (part by mass) | Type | Compounded amount (part by mass) | |
| Comparative Example 4 | PGA | 100 | — | — | — | — | $5.0 \times 10^4$ |
| Comparative Example 5 | PGA | 100 | Adipic acid | 10 | — | — | $5.2 \times 10^4$ |

As is clear from the results shown in Table 2, although the accelerated storage test was started using PGA having MW=$17.6 \times 10^4$ in all of the working examples and comparative examples, the polyester resin compositions of the present invention in which a carboxylic acid anhydride was added to polyglycolic acid (Working Examples 26 to 28) had high average molecular weight after the accelerated storage test (i.e. the degree of decrease in average molecular weight due to the accelerated storage test was small) and had excellent storing properties compared to that of the polyester resin composition containing only polyglycolic acid (Comparative Example 4). On the other hand, the storing properties of the polyester resin composition containing, in place of the carboxylic acid anhydride, a carboxylic acid which was not an acid anhydride (Comparative Example 5) were the same as that of the polyester resin composition containing only polyglycolic acid (Comparative Example 4), and it was found that the storing properties were inferior to that of the polyester resin compositions of the present invention.

INDUSTRIAL APPLICABILITY

As described above, the present invention makes it possible for the degradation of the polyester resin containing at least 50% by mass of a glycolic acid resin to proceed even at relatively low temperatures (e.g. less than 60° C., and preferably less than or equal to 50° C.), and also makes it possible to control the degradation during storage.

Therefore, since the polyester resin composition of the present invention exhibits excellent degradability at relatively low temperatures, the molded articles, such as short fibers, formed from such a polyester resin composition are advantageously used as a well-treatment fluid (e.g. sealers for fracturing fluids) that is suitable for drilling or completion of oil and gas recovery not only at high temperatures (e.g. 60° C. or higher) but also at low temperatures (e.g. less than 60° C., and preferably less than or equal to 50° C.) and the like.

Furthermore, since the polyester resin composition of the present invention is hardly degraded and deteriorated during storage, the polyester resin composition is advantageously used as a raw material that is suitable for mass-production of various molded articles such as short fibers.

What is claimed is:

1. A polyester resin composition comprising: 100 parts by mass of a polyester resin component having at least 50% by mass of a glycolic acid resin of said component; and from 0.5 to 50 parts by mass of an aromatic tetracarboxylic dianhydride.

2. The polyester resin composition according to claim 1, further comprising from 0.01 to 10 parts by mass of a phosphorus compound per 100 parts by mass of the polyester resin.

3. The polyester resin composition according to claim 2, wherein the phosphorus compound is an organic phosphorus compound.

4. The polyester resin composition according to claim 3, wherein the organic phosphorus compound is at least one selected from the group consisting of phosphates and phosphites.

5. The polyester resin composition according to claim 4, wherein the organic phosphorus compound has at least one structure selected from the group consisting of a long-chain alkyl group having from 8 to 24 carbons, an aromatic ring, and a pentaerythritol skeleton.

6. The polyester resin composition according to claim 1, wherein the aromatic tetracarboxylic dianhydride is 3,3',4,4'-benzophenone tetracarboxylic dianhydride.

7. The polyester resin composition according to claim 1, wherein the aromatic tetracarboxylic dianhydride is diphenylsulfone tetracarboxylic dianhydride.

8. The polyester resin composition according to claim 1, wherein the glycolic acid resin is a homopolymer consisting only of glycolic acid units.

9. The polyester resin composition according to claim 1, wherein the polyester resin component comprises at least 90% by mass of the glycolic acid resin.

10. A molded article formed from the polyester resin composition described in claim 1.

11. A well-treatment dispersion liquid comprising the molded article described in claim 10.

12. The molded article according to claim 6 having any one form selected from powder, a pellet, a film, and a fiber.

13. A well-treatment dispersion liquid comprising the molded article described in claim 12.

* * * * *